United States Patent
Ranta

(10) Patent No.: US 7,688,573 B2
(45) Date of Patent: Mar. 30, 2010

(54) ENCLOSURE AND COVER ASSEMBLY THEREFOR

(75) Inventor: Michael J. Ranta, Morton, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/195,909

(22) Filed: Aug. 21, 2008

(65) Prior Publication Data

US 2010/0046147 A1 Feb. 25, 2010

(51) Int. Cl.
*H02B 1/26* (2006.01)
(52) U.S. Cl. .................. 361/645; 361/644; 361/652
(58) Field of Classification Search ............. 361/644, 361/645
See application file for complete search history.

(56) References Cited

U.S. PATENT DOCUMENTS

| | | | | |
|---|---|---|---|---|
| 3,192,447 A | * | 6/1965 | Kenyeres et al. | ............. 361/645 |
| 3,339,124 A | * | 8/1967 | Jorgensen | .................... 361/641 |
| 3,356,907 A | * | 12/1967 | Bragulat | ..................... 361/645 |
| 3,618,804 A | * | 11/1971 | Krause | ....................... 220/3.8 |
| 3,777,224 A | * | 12/1973 | Meacham | ................... 361/643 |
| 4,783,718 A | | 11/1988 | Raabe et al. | |
| 5,072,848 A | * | 12/1991 | Pipis et al. | ................... 220/241 |
| 5,638,256 A | | 6/1997 | Leach et al. | |
| 5,745,337 A | | 4/1998 | Reiner | |
| 6,279,768 B1 | | 8/2001 | Mendoza et al. | |
| 6,421,229 B1 | | 7/2002 | Campbell et al. | |
| 6,570,754 B2 | | 5/2003 | Foley et al. | |
| 6,700,060 B1 | | 3/2004 | Johnson | |
| 6,879,483 B2 | | 4/2005 | Johnson et al. | |
| 7,049,516 B1 | | 5/2006 | Haag et al. | |
| 7,075,003 B2 | | 7/2006 | Johnson et al. | |
| 7,209,343 B2 | | 4/2007 | Remmert et al. | |
| 7,292,433 B2 | | 11/2007 | Johnson et al. | |
| 2008/0078133 A1 | | 4/2008 | Remmert et al. | |

* cited by examiner

*Primary Examiner*—Gregory D Thompson
(74) *Attorney, Agent, or Firm*—Martin J. Moran

(57) ABSTRACT

A cover assembly is provided for an enclosure, such as an electrical enclosure. The enclosure includes a panel member and a plurality of sides extending outwardly from the panel member to define an interior. The cover assembly includes an inner cover, at least one fastening mechanism fastening the inner cover to the enclosure, a trim member at least partially overlaying the inner cover, and at least one biasing assembly coupling the trim member to the inner cover. The at least one biasing assembly biases the trim member toward the inner cover, and is structured to bias the trim member toward an exterior surface of a structure, such as a building wall, to which the electrical enclosure is coupled.

17 Claims, 6 Drawing Sheets

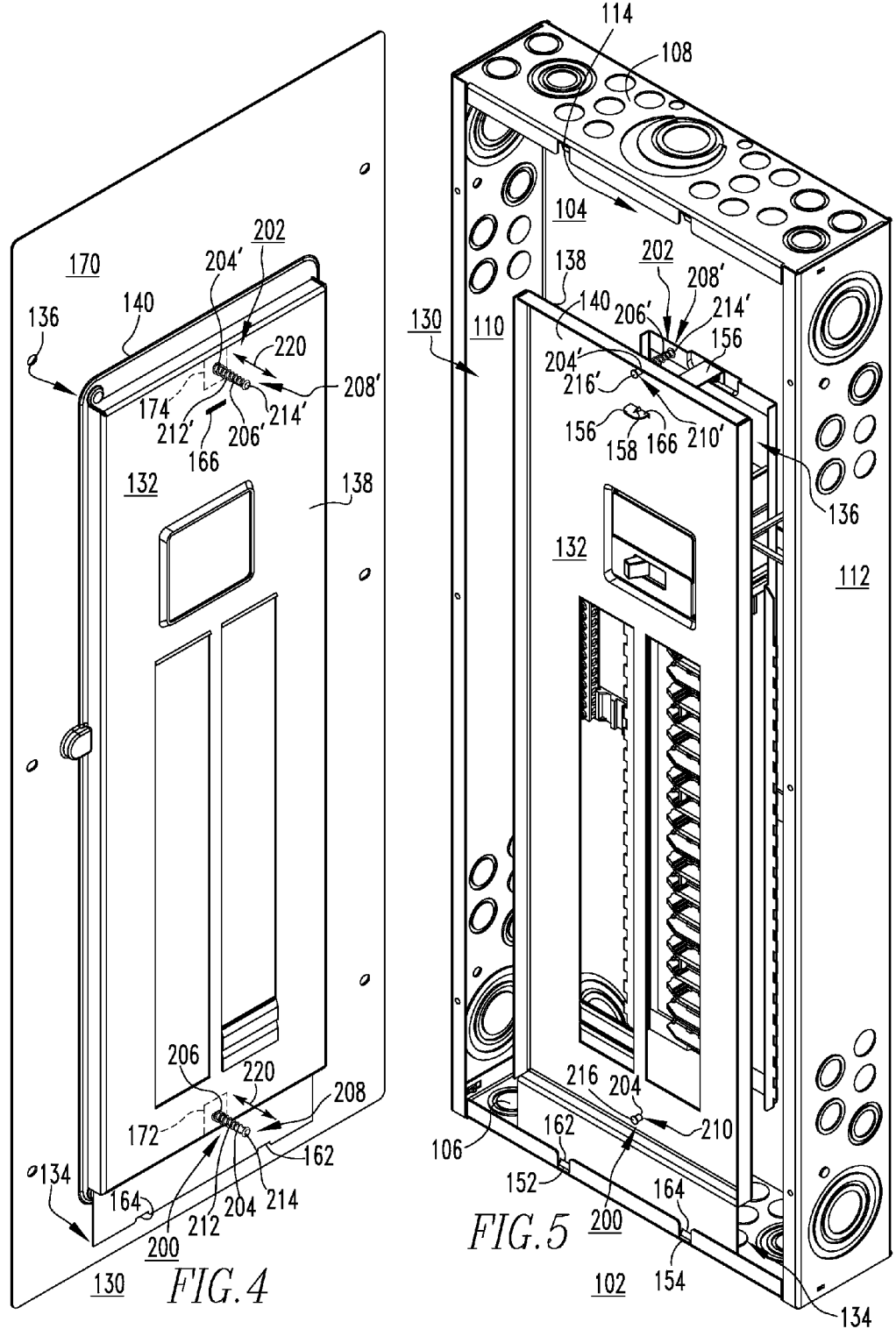

ENCLOSURE AND COVER ASSEMBLY THEREFOR

BACKGROUND OF THE INVENTION

1. Field of the Invention

The invention relates generally to enclosures and, more particularly, to enclosures, such as electrical enclosures. The invention also relates to cover assemblies for enclosures.

2. Background Information

Buildings, such as for example, commercial buildings and residences, typically have an electrical distribution center with an enclosure such as, for example, a box or a cabinet, which houses electrical equipment (e.g., without limitation, relays; circuit breakers; meters; transformers).

For example, FIG. 1 shows an electrical enclosure 2 (e.g., without limitation, a panel board; a control center; a load center), which collectively houses the circuit breakers 20 for branch circuits (not shown) at a site served by an electric power distribution system (not shown). The electrical enclosure 2 includes a housing 4, which is recessed to be substantially flush with a wall surface 6. A cover assembly 8 is mounted on the front of the housing 4. The cover assembly 8 includes a trim piece 10 and an inner cover 14, and the trim piece 10 supports a hinged door 12. The inner cover 14 is accessible when the hinged door 12 is open (shown), and includes a number of openings, such as openings 16 and 18, through which portions of the branch circuit breakers 20 and a main circuit breaker 22 protrude, respectively.

Installing the electrical enclosure 2 and, in particular the cover assembly 8 therefor, can be relatively difficult. Specifically, the installer must first use two hands to align the inner cover 14 and, in particular, the openings 16,18 thereof with circuit breakers 20,22, respectively, and must simultaneously attempt to insert and fasten screws on other suitable fasteners to hold it in place. Then, the trim piece 10 must be separately aligned with respect to the inner cover 14 and be fastened in place. As shown in FIG. 2, this process is further complicated by the fact that it is desirable to ensure that the trim piece 10 is properly aligned and secured with respect to the wall surface 6 so as to be substantially flush with respect thereto.

There is, therefore, room for improvement in enclosures, such as electrical enclosures, and in cover assemblies therefor.

SUMMARY OF THE INVENTION

These needs and others are met by embodiments of the invention, which are directed to an enclosure cover assembly, which among other benefits, is structured to facilitate installation of the enclosure.

As one aspect of the invention, a cover assembly is provided for an enclosure. The enclosure includes a panel member and a plurality of sides extending outwardly from the panel member to define an interior. The cover assembly comprises: an inner cover; at least one fastening mechanism structured to fasten the inner cover to the enclosure; a trim member at least partially overlaying the inner cover; and at least one biasing assembly coupling the trim member to the inner cover. Such biasing assembly biases the trim member toward the inner cover.

The inner cover may comprise a first end and a second end, and the at least one fastening mechanism may comprise a number of protrusions and a number of locating apertures. The number of locating apertures may be disposed at or about the first end of the inner cover, and the number of protrusions may be structured to extend outwardly from a corresponding one of the sides of the enclosure. When the inner cover is fastened to the enclosure, each of the number of protrusions may be disposed within a corresponding one of the number of locating apertures. The number of protrusions may be a first tab and a second tab, and the number of locating apertures may be a first locating aperture and a second locating aperture, wherein the first tab is disposed in the first locating aperture, and wherein the second tab is disposed in the second locating aperture.

The at least one fastening mechanism may further comprise a latch. The latch may be structured to be coupled to the panel member of the enclosure, and may be further structured to extend perpendicularly outwardly with respect to the panel member. The inner cover may further comprise a latch hole disposed proximate the second end of the inner cover. When the inner cover is fastened to the enclosure, the latch may be structured to be disposed in the latch hole. The inner cover may further comprise a first side structured to face toward the interior of the enclosure, and a second side disposed opposite the first side of the inner cover. The latch may include a projection, and the projection may cooperate with the second side of the inner cover to retain the inner cover in position with respect to the enclosure, without a number of separate fasteners.

Each of the at least one biasing assembly may comprise an elongated member and a spring. The elongated member may include a first end, a second end disposed opposite and distal from the first end of the elongated member, and a shank extending therebetween. The first end of the elongated member may include a first enlarged head, and the second end of the elongated member may include a second enlarged head, wherein the spring is disposed on the shank between the first enlarged head and the second enlarged head. The inner cover may comprise a first side structured to face the interior of the enclosure, and a second side disposed opposite the first side of the inner cover, wherein the shank of the elongated member extends through the inner cover, in order that the first enlarged head is disposed on the first side of the inner cover and the second enlarged head is disposed on the second side of the inner cover. The spring may be disposed between the first side of the inner cover and the first enlarged head of the elongated member.

The trim member may comprise a number of mounting tabs. Each of the number of mounting tabs may include an interior facing toward the inner cover and an exterior disposed opposite the interior. The elongated member of the at least one biasing assembly may extend through a corresponding one of the number of mounting tabs of the trim member, and the second enlarged head of the elongated member may be disposed on the exterior of the corresponding one of the number of mounting tabs. The inner cover may further comprise a first end and a second end disposed opposite and distal from the first end of the inner cover. The at least one biasing assembly may be a first biasing assembly disposed proximate the first end of the inner cover and a second biasing assembly disposed proximate the second end of the inner cover. The trim member may further comprise an opening including a first end and a second end disposed opposite and distal from the first end of the opening, wherein the number of mounting tabs is a first mounting tab extending outwardly from the trim member at or about the first end of the opening, and a second mounting tab extending outwardly from the trim member at or about the second end of the opening. The second enlarged head of the elongated member of the first biasing assembly may be disposed on the exterior of the first mounting tab, and the second enlarged head of the elongated member of the second biasing assembly may be disposed on the exterior of the second mounting tab.

As another aspect of the invention, an enclosure comprises: a panel member; a plurality of sides extending outwardly from the panel member to define an interior; and a cover assembly overlaying the interior, the cover assembly comprising: an inner cover, at least one fastening mechanism fastening the inner cover to the enclosure, a trim member at least partially overlaying the inner cover, and at least one biasing assembly coupling the trim member to the inner cover. Such biasing assembly biases the trim member toward the inner cover.

The enclosure may be an electrical enclosure. The cover assembly of the electrical enclosure may further comprise a door, wherein the door is pivotably coupled to the trim member. The plurality of sides of the electrical enclosure and the panel member of the electrical enclosure may be structured to be coupled to a structure having an exterior surface. The at least one biasing assembly of the cover assembly may be structured to bias the trim member toward the exterior surface of the structure.

BRIEF DESCRIPTION OF THE DRAWINGS

A full understanding of the invention can be gained from the following description of the preferred embodiments when read in conjunction with the accompanying drawings in which:

FIG. 4 is an isometric view of the back side of the cover assembly of FIG. 3;

FIG. 5 is an assembled isometric view of the enclosure and cover assembly therefor of FIG. 3, with the trim member of the cover assembly removed to show internal structures;

DESCRIPTION OF THE PREFERRED EMBODIMENTS

Figure 1:
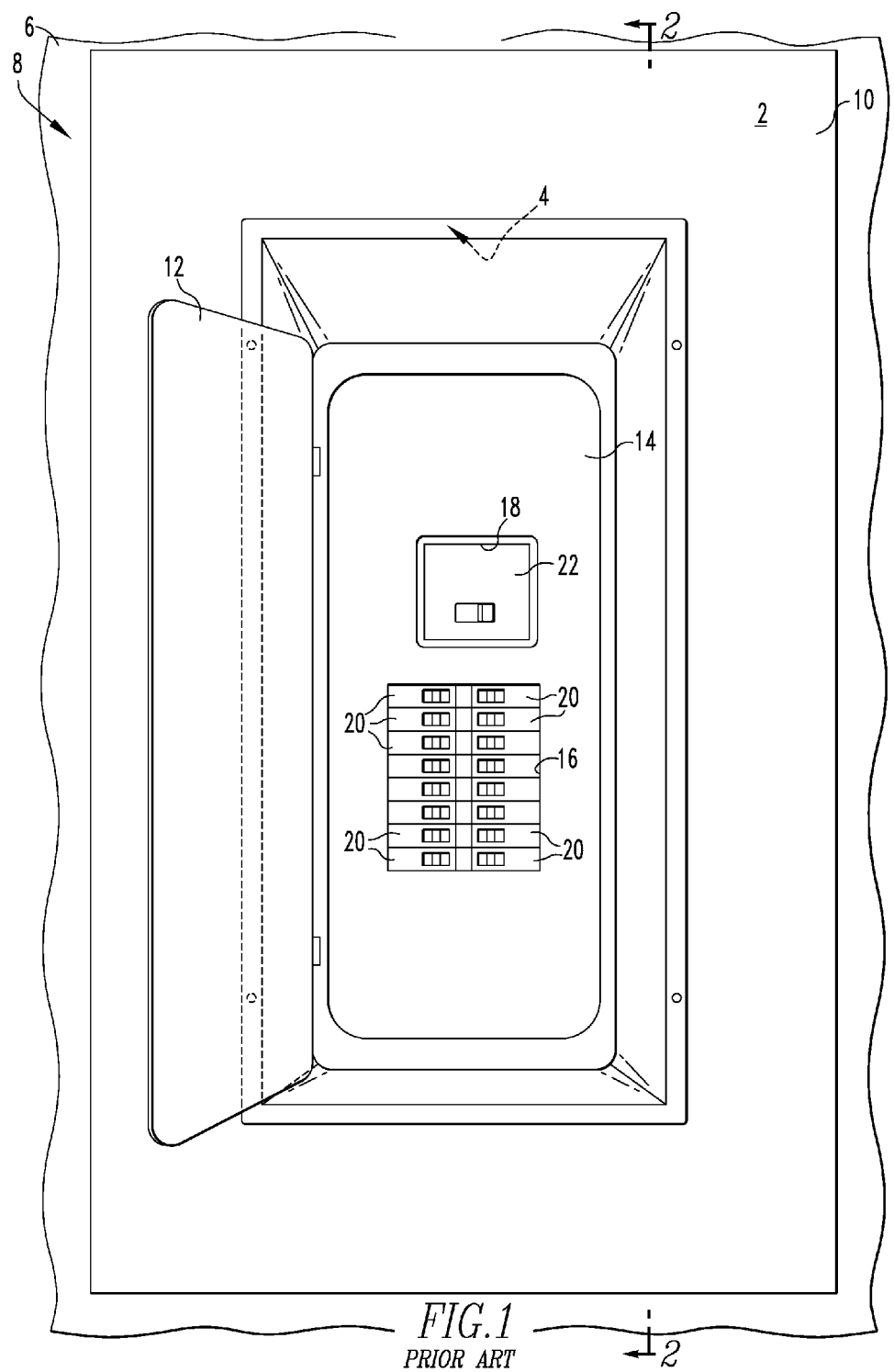
FIG. 1 is a Prior Art front elevational view of a panel board.

For purposes of illustration, embodiments of the invention will be described as applied to a cover assembly for electrical enclosures housing electrical equipment (e.g., without limitation, relays; circuit breakers; electric meters; transformers) and being structured for mounting within a structure, such as for example, the wall of a building. However, it will become apparent that they could also be applied to other types of enclosures adapted for indoor and/or outdoor (i.e., weather-resistant) use and/or for mounting in locations other than within the wall of a building.

Directional phrases used herein, such as, for example, top, bottom, front, back, left, right, upper, lower and derivatives thereof, relate to the orientation of the elements shown in the drawings and are not limiting upon the claims unless expressly recited therein.

As employed herein, the terms "overlay" and "overlaying" refer to the orientation of the disclosed cover assembly with respect to an electrical enclosure, wherein the sides of the electrical enclosure extend outwardly from a panel member of the electrical enclosure to define an interior, and wherein the cover assembly is disposed over or on top of the sides of the electrical enclosure in order to substantially cover and enclose the interior.

As employed herein, the phrase "at least partially overlaying" refers to the orientation of the trim member of the disclosed cover assembly with respect to the inner cover of the disclosed cover assembly, wherein the trim member is disposed over or on top of the inner cover, and wherein at least some of the inner cover is behind or under the trim member. In embodiments of the invention where the trim member includes an opening, a portion of the inner cover is accessible through the opening of the trim member while the remainder of the inner cover is disposed behind or under the trim member.

As employed herein, the term "structure" shall expressly include, but is not limited to, a home, apartment, dwelling, garage, office building, commercial building, industrial building, roofed and/or walled structure built for permanent or temporary use, structure for a land vehicle, structure for a marine vehicle, structure for an air vehicle, or structure for another motor vehicle.

As employed herein, the term "land vehicle" shall expressly include, but is not limited to, any land-based vehicles having pneumatic tires, any rail-based vehicles, any maglev vehicles, automobiles, cars, trucks, station wagons, sport-utility vehicles (SUVs), recreational vehicles, all-terrain vehicles, vans, buses, motorcycles, mopeds, campers, trailers, or bicycles.

As employed herein, the term "marine vehicle" shall expressly include, but is not limited to, any water-based vehicles, ships, boats, other vessels for travel on water, submarines, or other vessels for travel under water.

As employed herein, the term "air vehicle" shall expressly include, but is not limited to, any air-based vehicles, airplanes, jets, aircraft, airships, balloons, blimps, or dirigibles.

As employed herein, the term "fastener" refers to any suitable connecting or tightening mechanism expressly including, but not limited to, screws, bolts (e.g., without limitation, carriage bolts) and the combinations of bolts and nuts (e.g., without limitation, lock nuts and wing nuts) and bolts, washers and nuts.

As employed herein, the term "fastening mechanism" shall mean a mechanism or structure, other than a fastener, for joining one component to another component expressly including, but not limited to, interlocking structures such as tabs and other suitable projections and protrusions, which cooperate together or with openings, holes and other suitable apertures.

As employed herein, the statement that two or more parts are "coupled" together shall mean that the parts are joined together either directly or joined through one or more intermediate parts.

As employed herein, the term "number" shall mean one or more than one (i.e., a plurality).

Figure 3:
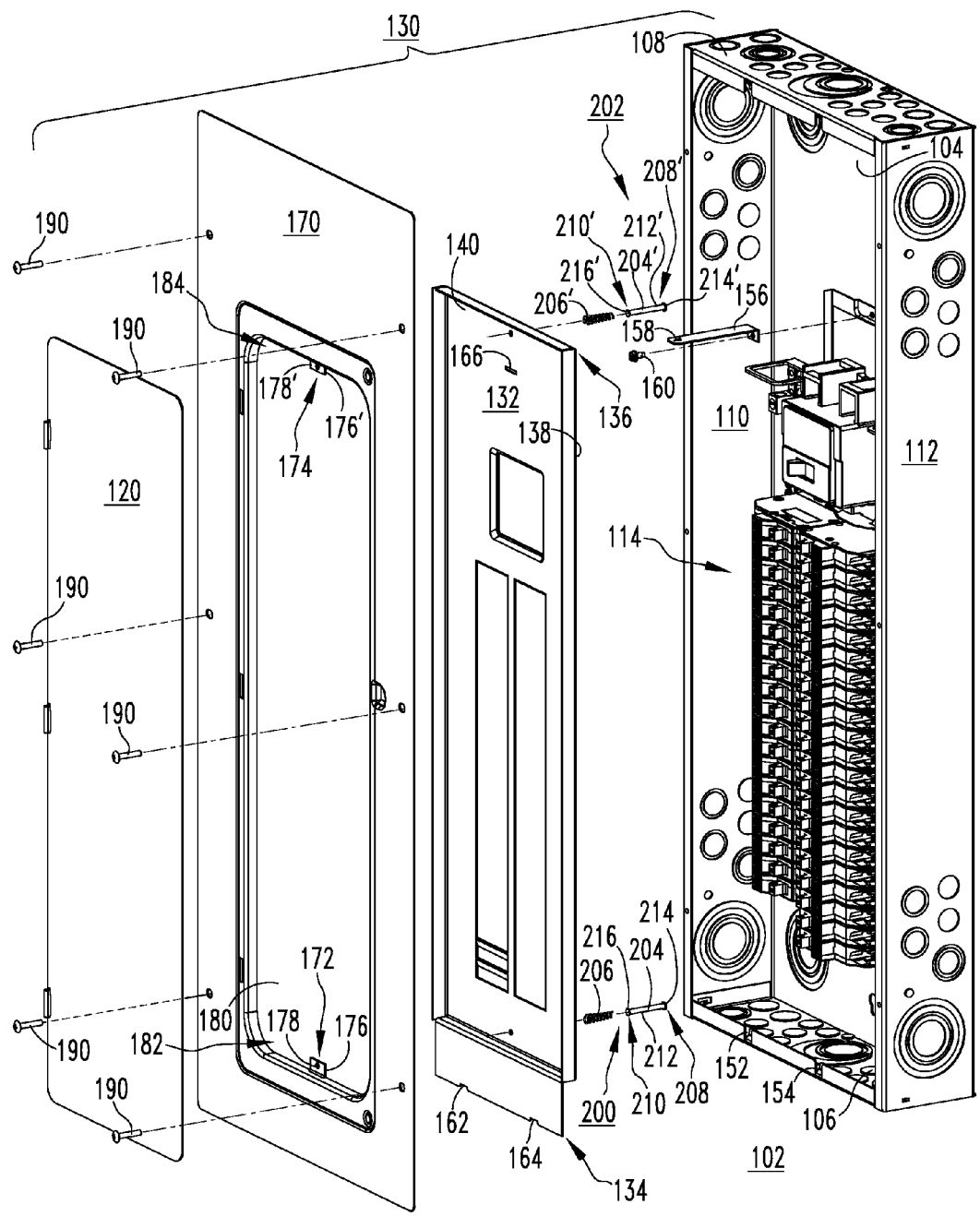
FIG. 3 is an exploded isometric view of an enclosure and cover assembly therefor, in accordance with an embodiment of the invention.

FIG. 3 shows a cover assembly 130 for an enclosure, such as an electrical enclosure 102 (e.g., without limitation, a panel board; a control center; a load center). The electrical enclosure 102 includes a panel member 104, and first, second, third and fourth sides 106,108,110 and 112 extending outwardly from the panel member 104 to define an interior 114.

The cover assembly 130 includes an inner cover 132 and at least one fastening mechanism 152,154,156,162,164,166, which is structured to fasten the inner cover 132 to the electrical enclosure 102, as will be described hereinbelow. A trim member 170, at least partially overlays (best shown in FIG. 6)

the inner cover 132, and at least one biasing assembly 200, 202 couples the trim member 170 to the inner cover 132. As will be described hereinbelow, in addition to coupling the inner cover 132 and trim member 170 together, the biasing assemblies 200,202 also bias the trim member 170 toward the inner cover 132 (see, for example, directional arrows 220 of FIG. 4), thereby facilitating installation of the electrical enclosure 102 when it is mounted to a structure such as, for example and without limitation, the building wall 300 partially shown in FIG. 7.

Continuing to refer to FIG. 3, and also to FIGS. 4 and 5, the inner cover 132 includes first and second opposing ends 134, 136, a first side 138 facing the interior 114 (FIGS. 3 and 5) of the electrical enclosure 102 (FIGS. 3 and 5), and a second side 140 disposed opposite the first side 138. In the example shown and described herein, the fastening mechanisms for fastening the inner cover 132 to the electrical enclosure 102 (FIGS. 3 and 5) include a number of protrusions, such as the first and second tabs 152,154, which extend outwardly from the first side 106 of the electrical enclosure 102, as shown in FIGS. 3 and 5 (see also tab 162 shown in hidden line drawing in FIG. 7), and a number of corresponding locating apertures, such as the first and second locating apertures 162,164 disposed at or about the first end 134 of the inner cover 132, as shown in FIGS. 3-5 (see also locating aperture 162 shown in hidden line drawing in FIG. 7). When the inner cover 132 is fastened to the enclosure 102, as shown in FIG. 5 (also shown in hidden line drawing in FIG. 7), the first tab 152 is disposed in the first locating aperture 162, and the second tab 154 is disposed in the second locating aperture 164. It will, however, be appreciated that any known or suitable alternative number and/or configuration of protrusions (e.g., 152,154) and locating apertures (e.g., 162,164) could be employed without departing from the scope of the invention.

Figure 6:
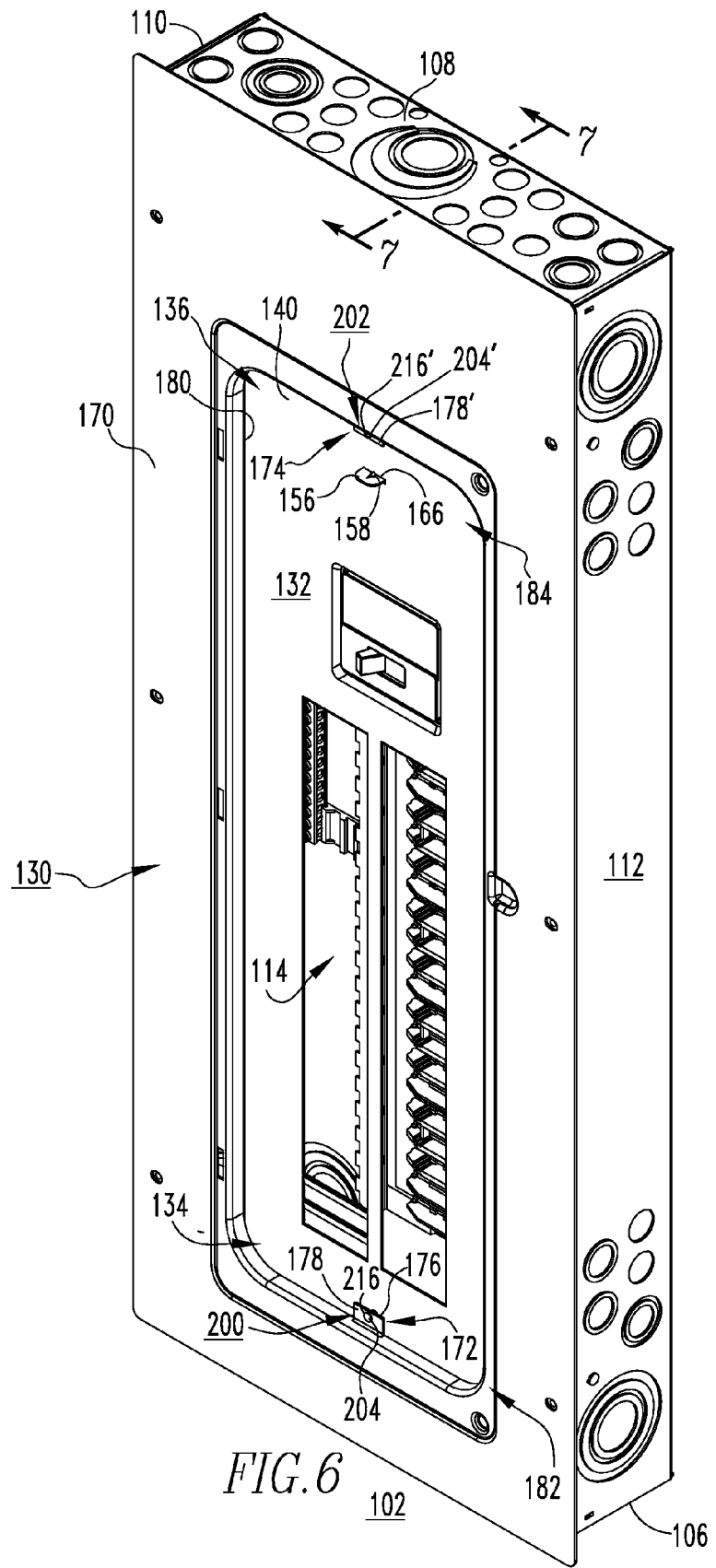
FIG. 6 is an isometric view of the enclosure and cover assembly therefor of FIG. 5, also showing the trim member in its assembled position.
Figure 7:
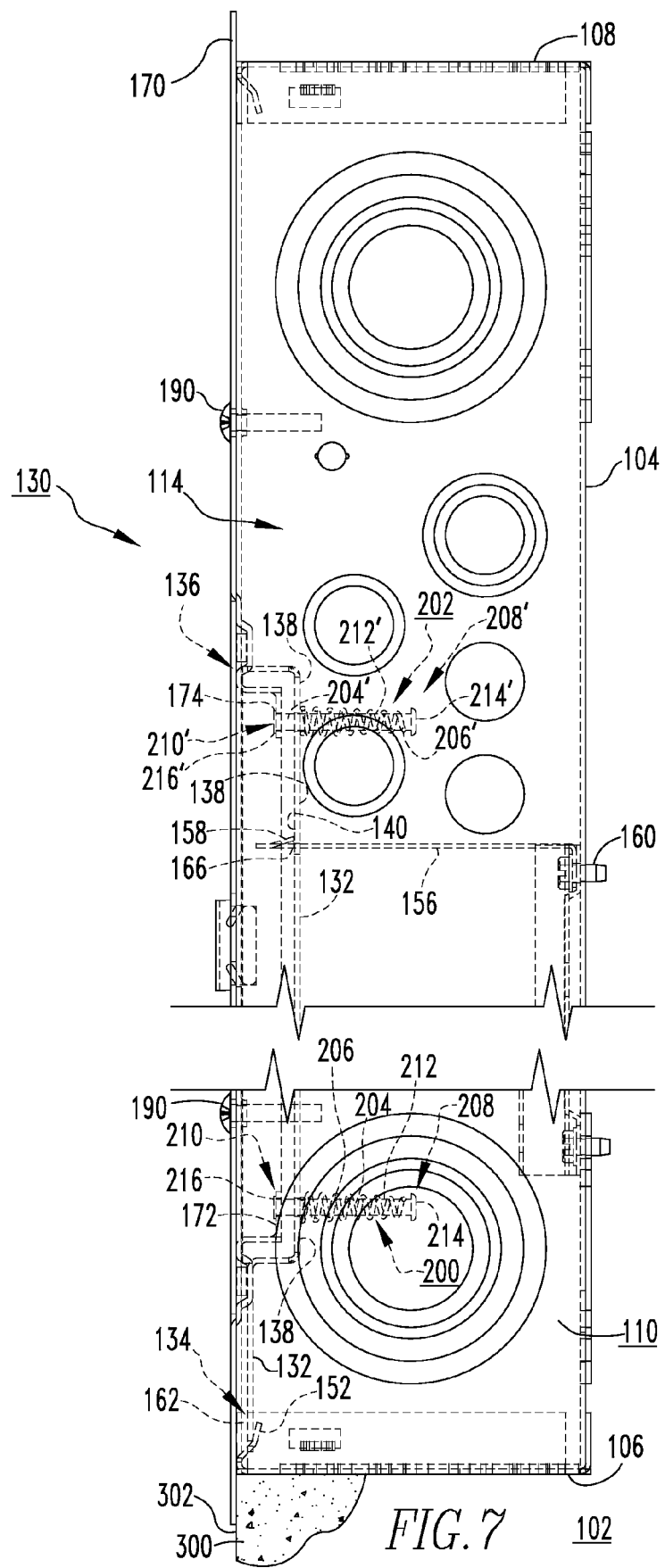
FIG. 7 is a segmented vertical section along line 7-7 of FIG. 6.

In addition to the aforementioned protrusions 152,154 and locating apertures 162,164, the inner cover 132 is further fastened to the electrical enclosure 102 by a latch 156 (FIGS. 3, 5, 6 and 7 (shown in hidden line drawing in FIG. 7)). The latch 156 is coupled to the panel member 104 of the electrical enclosure 102 such as, for example and without limitation, by a suitable fastener 160, as shown in FIGS. 3 and 7. The inner cover 132 of the cover assembly 130 includes a latch hole 166 (FIGS. 3-7). The latch 156 extends perpendicularly outwardly with respect to the electrical enclosure panel member 104 in order that it is disposed in the latch hole 166 when the inner cover 132 is fastened to the electrical enclosure 102, as shown in FIGS. 5, 6 and 7 (shown in hidden line drawing in FIG. 7). The example latch 156 further includes a projection 158 (e.g., without limitation, a barb) extending outwardly from the latch 156 to cooperate with the second side 140 of the inner cover 132 and retain the inner cover 132 in position with respect to the electrical enclosure 102.

Figure 2:
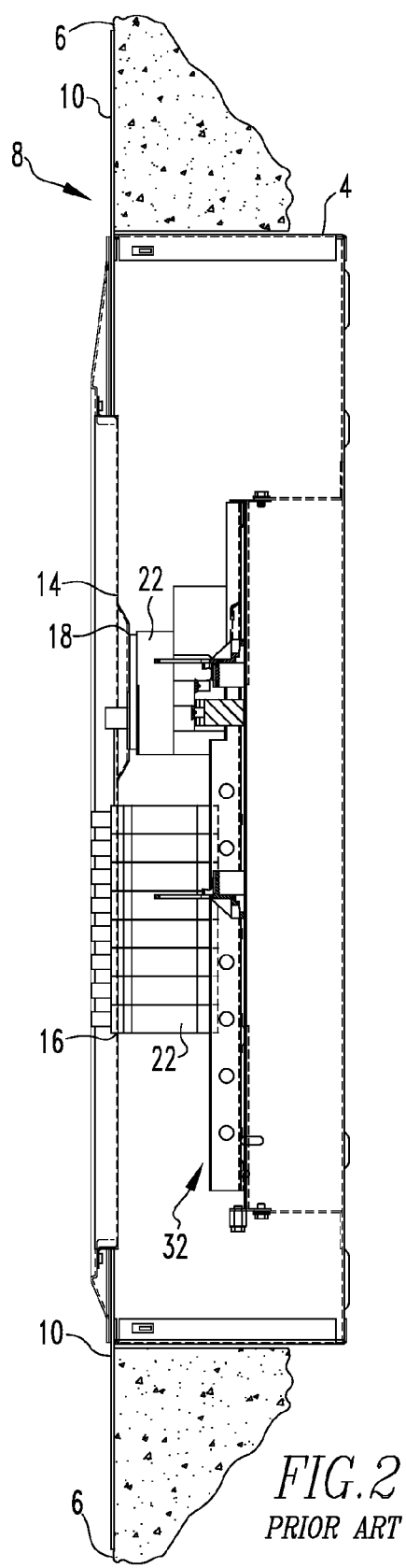
FIG. 2 is a vertical section along line 2-2 of Prior Art FIG. 1.

Accordingly, it will be appreciated that the combination of protrusions 152,154 and locating apertures 162,164, as well as the latch 156 and projection 158 thereof, enable the inner cover 132 of the disclosed cover assembly 30 to be relatively quickly and easily aligned and fastened to the electrical enclosure 102, without requiring the use of a number of separate fasteners. This greatly simplifies the installation procedure over known electrical enclosure designs (see, for example, electrical enclosure 2 of FIGS. 1 and 2) wherein the person installing the electrically enclosure has to simultaneously hold the inner cover (see inner cover 14 of electrical enclosure 2 of FIGS. 1 and 2) in place while aligning it and inserting a plurality of fasteners to fasten it to the electrical enclosure (see electrical enclosure 2 of FIGS. 1 and 2) and/or to the structure (see, for example, wall 6 of FIGS. 1 and 2) to which to electrical enclosure is coupled.

As best shown in FIGS. 3, 4 and 7, the example cover assembly 130 includes a first biasing assembly 200 disposed proximate the first end 134 of the inner cover 132 and a second biasing assembly 202 disposed proximate the second end 136 of the inner cover 132. It will, however, be appreciated that any known or suitable additional number and/or configuration of biasing assemblies (e.g., 200,202) could be employed within the scope of the invention. For economy of disclosure, only one of the biasing assemblies, 200, will be described in detail. It will, however, be appreciated that the other biasing assembly 202 is substantially identical in structure. The biasing assembly 200 includes an elongated member 204 and a spring 206. The elongated member 204 has opposing first and second ends 208,210 (both shown in FIGS. 3 and 7 (shown in hidden line drawing in FIG. 7)) with a shank 212 extending therebetween. The first end 208 includes a first enlarged head 214, and a second end 210 includes a second enlarged head 216 (FIGS. 3 and 7). The spring 206 is disposed on the shank 212 of the elongated member 204, between the first and second enlarged heads 214,216, as shown in hidden line drawing in FIG. 7. Also shown in hidden line drawing in FIG. 7, the shank 212 of the elongated member 204 extends through the inner cover 132, in order that the first enlarged head 214 is disposed on the first side 138 of the inner cover 132, the second enlarged head 216 is disposed on the second side 140 of the inner cover 132, and the spring 206 is disposed between the first side 138 of the inner cover 132 and the first enlarged head 214 of the elongated member 204.

The example elongated member is a rivet 204 having a rivet head 216 at the second end 210 thereof. The first enlarged head 214 of the first end 208 of the rivet 204 is not formed until after the rivet has been inserted through the trim member 170, inner cover 132 and spring 206, as desired. After the biasing assembly 200 has been properly assembled with respect to the cover assembly 130, the first enlarged head 214 of the rivet 204 is formed by flaring the first end 208 of the rivet 204 in a generally well known manner. Thus, the spring 206 is retained on the shank 212 of the rivet 204 (see also, spring 206' retained on shank 212' of rivet 204' in FIGS. 4 and 7 (shown in hidden line drawing in FIG. 7)), and the entire biasing assembly 200 is retained in the desired position with respect to the cover assembly 130. It will, however, be appreciated that the rivet 204 could be installed in the opposite direction (e.g., with the first and second ends 208,210 of the rivet 204 being reversed). It will be further appreciated that any known or suitable alternative elongated member (not shown) other than the example rivet 204 could be employed, without departing from the scope of the invention. For example and without limitation, an elongated member consisting of two or more components (not shown), such as a central tubular shank and fasteners having enlarged heads engaging the opposite ends of the shank (not shown), or interconnecting male and female components that are fastened (e.g., without limitation, threaded) together to form the desired elongated member (not shown), could be employed.

The trim member 170 of the example cover assembly 130 includes first and second mounting tabs 172,174 (FIGS. 3 and 6; also shown in hidden line drawing in FIGS. 4 and 7). As best shown in FIG. 3, the first and second mounting tabs 172,174 are disposed at opposing first and second ends 182, 184, respectively, of an opening 180 in the trim member 170. Specifically, the first mounting tab 172 extends outwardly from the trim member 170 at or about the first end 182 of the opening 180, and the second mounting tab 174 extends outwardly from the trim member 170 at or about the second end 184 of the opening 180, as shown in FIGS. 3 and 6 (see also mounting tabs 172,174, shown in hidden line drawing in FIG. 4). As shown in FIGS. 3 and 6, the first mounting tab 172 includes an interior 176 facing toward the inner cover 132 and an exterior 178 disposed opposite the interior 176. Likewise, the second mounting tab 174 includes an opposing interior 176' and exterior 178'. The aforementioned rivet 204 of the first biasing assembly 200 extends through the first mounting tab 172 such that the second enlarged head 216 of the rivet 204 is disposed on the exterior 178 of the first mounting tab 172, as shown in FIG. 6. Likewise, as partially shown in FIG. 6, the rivet 204' of the second biasing assembly 202 extends through the second mounting tab 174 of the trim member 170 such that the second enlarged head 216' of the rivet 204' is disposed on the exterior 178' of the second mounting tab 174. Thus, as shown in FIG. 6 and in hidden line drawing in FIG. 7, it will be appreciated that the biasing assemblies 200,202 couple the inner cover 132 and trim member 170 together and, when the inner cover 132 is fastened with respect to the electrical enclosure 102, the biasing assembly 200,202 biases the trim member 170 toward the inner cover 132 (see, for example, arrows 220 of FIG. 4). It will also be appreciated that when the electrical enclosure 102 is coupled to a structure such as, for example and without limitation, the building wall 300 partially shown in FIG. 7, which has an exterior surface 302, the biasing assemblies 200,202 further advantageously bias the trim member 170 toward the exterior surface 302 of the wall 300 or other suitable structure to provide a substantially flush fit of the trim member 170 with respect thereto.

It will be appreciated that the shape and/or configuration of the electrical enclosure 102, and the inner cover 132 and trim member 170 of the cover assembly 130 therefor, which are shown and described herein, are provided for purposes of illustration only and are not intended to in any way limit the scope of the invention. For example, the trim member 170 shown and described herein includes a door 120 (FIG. 3), which is pivotably coupled to the trim member 170. However, the trim member 170 could have any known or suitable alternative configuration (not shown) with or without such a door 120. Additionally, while the trim member 170 in the example of FIG. 3 is shown as being further secured with respect to the electrical enclosure 102 by way of six screws 190, any known or suitable alternative number, configuration and/or type of fastener or fastener mechanism, as defined herein, could be employed to fasten the trim member 170 to the electrical enclosure 102. Alternatively, the trim member 170 could be secured by way of the aforementioned biasing assemblies 200,202, without the requirement for additional fasteners.

Accordingly, it will be appreciated that the disclosed cover assembly 130 greatly simplifies the process for installing the electrical enclosure 102. For example, because the inner cover 132 and trim member 170 of the cover assembly 130 are coupled together, and because the inner cover is fastened with respect to the electrical enclosure 102 without requiring separate fasteners, the steps for installing the cover assembly 130 are reduced to: (1) pushing inwardly on the inner cover 132 against the bias of the first biasing assembly 200 to space the first end 134 of the inner cover 132 from the trim member 170; (2) tilting the cover assembly 130 to align the locating apertures 162,164 with their corresponding tabs 152,154, respectively, of the electrical enclosure 102; and (3) pivoting the cover assembly 130 inwardly until the latch 156 secures the second end 136 of the inner cover 132. The installer's hands are then free to insert the fasteners 190 through the trim member 170 to fasten it in the desired position with respect to the electrical enclosure 102.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A cover assembly for an enclosure, said enclosure including a panel member and a plurality of sides extending outwardly from the panel member to define an interior, said cover assembly comprising:
an inner cover;
at least one fastening mechanism structured to fasten said inner cover to said enclosure;
a trim member at least partially overlaying said inner cover;
at least one biasing assembly coupling said trim member to said inner Cover;
wherein said at least one biasing assembly biases said trim member toward said inner cover; and
wherein said inner cover comprises a first end and a second end; wherein said at least one fastening mechanism comprises a number of protrusions and a number of locating apertures; wherein said number of locating apertures are disposed at or about the first end of said inner cover; wherein said number of protrusions are structured to extend outwardly from a corresponding one of the sides of said enclosure; and wherein, when said inner cover is fastened to said enclosure, each of said number of protrusions is structured to be disposed within a corresponding one of said number of locating apertures.

2. The cover assembly of claim 1 wherein said number of protrusions is a first tab and a second tab; wherein said number of locating apertures is a first locating aperture and a second locating aperture; wherein the first tab is disposed in the first locating aperture; and wherein the second tab is disposed in the second locating aperture.

3. The cover assembly of claim 2 wherein said plurality of sides of said enclosure are a first wall, a second wall disposed opposite and distal from the first wall, a third wall, and a fourth wall disposed opposite and distal from the third wall; and wherein said first tab and said second tab are structured to extend outwardly from the first wall of said enclosure.

4. The cover assembly of claim 1 wherein said at least one fastening mechanism further comprises a latch; wherein said latch is structured to be coupled to the panel member of said enclosure; wherein said latch is further structured to extend perpendicularly outwardly with respect to the panel member; wherein said inner cover further comprises a latch hole disposed proximate the second end of said inner cover; and wherein, when said inner cover is fastened to said enclosure, said latch is structured to be disposed in said latch hole.

5. The cover assembly of claim 4 wherein said inner cover further comprises a first side structured to face toward the interior of said inner cover, and a second side disposed opposite the first side of said inner cover; wherein said latch includes a projection; and wherein said projection cooperates with the second side of said inner cover to retain said inner cover in position with respect to said enclosure, without a number of separate fasteners.

6. A cover assembly for an enclosure, said enclosure including a panel member and a plurality of sides extending outwardly from the panel member to define an interior, said cover assembly comprising:
an inner cover;

at least one fastening mechanism structured to fasten said inner cover to said enclosure;
a trim member at least partially overlaying said inner cover;
at least one biasing assembly coupling said trim member to said inner cover;
wherein said at least one biasing assembly biases said trim member toward said inner cover; and
wherein said at least one biasing assembly comprises an elongated member and a spring; wherein the elongated member includes a first end, a second end disposed opposite and distal from the first end of said elongated member, and a shank extending therebetween; wherein the first end of said elongated member includes a first enlarged head; wherein the second end of said elongated member includes a second enlarged head; and wherein said spring is disposed on the shank between the first enlarged head and the second enlarged head.

7. The cover assembly of claim 6 wherein said inner cover comprises a first side structured to face the interior of said enclosure, and a second side disposed opposite the first side of said inner cover; wherein the shank of said elongated member extends through said inner cover, in order that the first enlarged head is disposed on the first side of said inner cover and the second enlarged head is disposed on the second side of said inner cover; and wherein said spring is disposed between the first side of said inner cover and the first enlarged head of said elongated member.

8. The cover assembly of claim 7 wherein said trim member comprises a number of mounting tabs; wherein each of said number of mounting tabs includes an interior facing toward said inner cover and an exterior disposed opposite the interior; wherein said elongated member of said at least one biasing assembly extends through a corresponding one of said number of mounting tabs of said trim member; and wherein the second enlarged head of said elongated member is disposed on the exterior of said corresponding one of said number of mounting tabs.

9. The cover assembly of claim 8 wherein said inner cover further comprises a first end and a second end disposed opposite and distal from the first end of said inner cover; wherein said at least one biasing assembly is a first biasing assembly disposed proximate the first end of said inner cover and a second biasing assembly disposed proximate the second end of said inner cover; wherein said trim member further comprises an opening including a first end and a second end disposed opposite and distal from the first end of said opening; wherein said number of mounting tabs is a first mounting tab extending outwardly from said trim member at or about the first end of said opening, and a second mounting tab extending outwardly from said trim member at or about the second end of said opening; wherein the second enlarged head of said elongated member of said first biasing assembly is disposed on the exterior of said first mounting tab; and wherein the second enlarged head of said elongated member of said second biasing assembly is disposed on the exterior of said second mounting tab.

10. An enclosure comprising:
a panel member;
a plurality of sides extending outwardly from the panel member to define an interior;
a cover assembly overlaying the interior, said cover assembly comprising:
an inner cover,
at least one fastening mechanism fastening said inner cover to said enclosure,
a trim member at least partially overlaying said inner cover,
at least one biasing assembly coupling said trim member to said inner cover;
wherein said at least one biasing assembly biases said trim member toward said inner cover; and
wherein said inner cover of said cover assembly comprises a first end and a second end; wherein said at least one fastening mechanism comprises a number of protrusions and a number of locating apertures; wherein said number of locating apertures are disposed at or about the first end of said inner cover; wherein said number of protrusions extend outwardly from a corresponding one of the sides of said enclosure; and wherein, when said inner cover is fastened to said enclosure, each of said number of protrusions is disposed within a corresponding one of said number of locating apertures.

11. The enclosure of claim 10 wherein said plurality of sides of said enclosure are a first wall, a second wall disposed opposite and distal from the first wall, a third wall, and a fourth wall disposed opposite and distal from the third wall; wherein said number of protrusions of said at least one fastening mechanism is a first tab and a second tab; wherein said number of locating apertures of said at least one fastening mechanism is a first locating aperture and a second locating aperture; wherein said first tab and said second tab are structured to extend outwardly from the first wall of said enclosure; wherein the first tab is disposed in the first locating aperture; and wherein the second tab is disposed in the second locating aperture.

12. The enclosure of claim 10 wherein said at least one fastening mechanism further comprises a latch; wherein said latch is coupled to the panel member of said enclosure; wherein said latch extends perpendicularly outwardly with respect to the panel member; wherein said inner cover further comprises a latch hole disposed proximate the second end of said inner cover; and wherein, when said inner cover is fastened to said enclosure, said latch is disposed in said latch hole.

13. The enclosure of claim 12 wherein said inner cover of said cover assembly further comprises a first side facing toward the interior of said enclosure, and a second side disposed opposite the first side; wherein said latch includes a projection; and wherein said projection cooperates with the second side of said inner cover to retain said inner cover in position with respect to said enclosure, without a number of separate fasteners.

14. An enclosure comprising:
a panel member;
a plurality of sides extending outwardly from the panel member to define an interior;
a cover assembly overlaying the interior, said cover assembly comprising:
an inner cover,
at least one fastening mechanism fastening said inner cover to said enclosure,
a trim member at least partially overlaying said inner cover,
at least one biasing assembly coupling said trim member to said inner cover;
wherein said at least one biasing assembly biases said trim member toward said inner cover; and
wherein least one biasing assembly of said cover assembly comprises an elongated member and a spring; wherein the elongated member includes a first end, a second end disposed opposite and distal from the first end of said elongated member, and a shank extending therebetween; wherein the first end of said elongated member includes a first enlarged head; wherein the second end of said elongated member includes a second enlarged head; and wherein said spring is disposed on the shank of said elongated member between the first enlarged head and the second enlarged head.

15. The enclosure of claim 14 wherein said inner cover of said cover assembly comprises a first side facing the interior of said enclosure, and a second side disposed opposite the first side of said inner cover; wherein the shank of said elongated member extends through said inner cover, in order that the first enlarged head is disposed on the first side of said inner cover and the second enlarged head is disposed on the second side of said inner cover; and wherein said spring is disposed between the first side of said inner cover and the first enlarged head of said elongated member.

16. The enclosure of claim 15 wherein said trim member of said cover assembly comprises a number of mounting tabs; wherein each of said number of mounting tabs includes an interior facing toward said inner cover and an exterior disposed opposite the interior; wherein said elongated member of said at least one biasing assembly extends through a corresponding one of said number of mounting tabs of said trim member; and wherein the second enlarged head of said elongated member is disposed on the exterior of said corresponding one of said number of mounting tabs.

17. The enclosure of claim 16 wherein said inner cover of said cover assembly further comprises a first end and a second end disposed opposite and distal from the first end of said inner cover; wherein said at least one biasing assembly is a first biasing assembly disposed proximate the first end of said inner cover and a second biasing assembly disposed proximate the second end of said inner cover; wherein said trim member further comprises an opening including a first end and a second end disposed opposite and distal from the first end of said opening; wherein said number of mounting tabs is a first mounting tab extending outwardly from said trim member at or about the first end of said opening, and a second mounting tab extending outwardly from said trim member at or about the second end of said opening; wherein the second enlarged head of said elongated member of said first biasing assembly is disposed on the exterior of said first mounting tab; and wherein the second enlarged head of said elongated member of said second biasing assembly is disposed on the exterior of said second mounting tab.

* * * * *